United States Patent Office 2,915,589
Patented Dec. 1, 1959

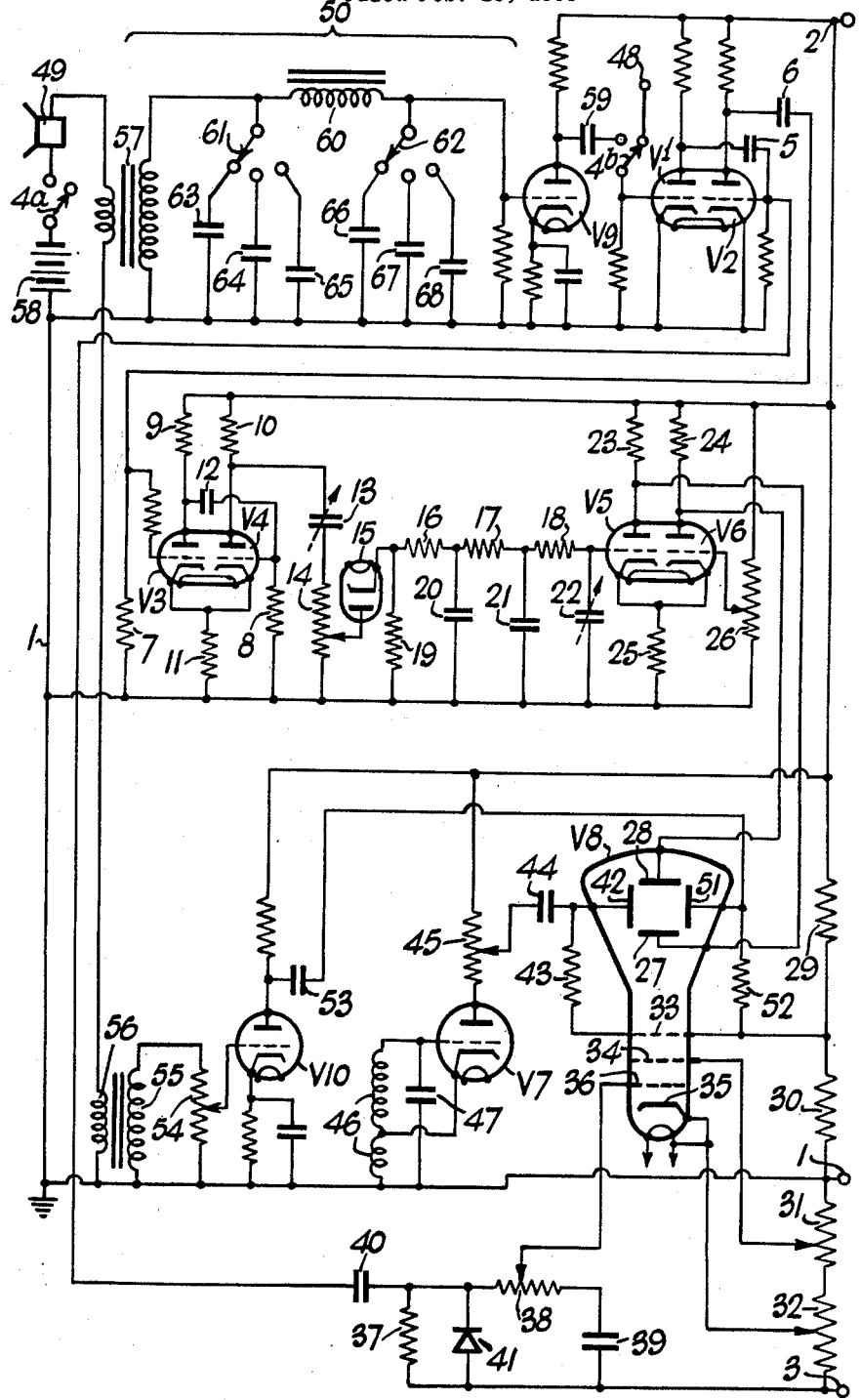

2,915,589

FREQUENCY INDICATORS

George Rhodes Gosling Plant, London, England, assignor to Speech Research For The Deaf Limited, London, England, a British company Application February 13, 1958, Serial No. 715,088

Claims priority, application Great Britain February 19, 1957

7 Claims. (Cl. 179—1)

This invention relates to methods and apparatus for indicating frequency. Though not limited in its application thereto, the invention is particularly suitable for the indication of the fundamental frequencies of complex repetitive or alternating waveforms. Such waveforms are generated by the vocal chords during the production of many of the sounds which comprise speech.

During the first few months of the life of a child who is deaf, or who has seriously impaired hearing, it is found that he will utter substantially the same type of baby noises as are made by young children with normal hearing. But from about a year old this instinctive use of his vocal chords gradually fades away due to his inability to hear sounds, and thereafter a deaf child will grow up to be substantially mute unless he is given comprehensive speech training by specially qualified teachers. In such training it is possible to demonstrate to the deaf child that a speech sound is a vibration which he can be taught to control so as to form intelligible words and sentences.

However, it is virtually impossible for a deaf child to understand the variation in frequency, or "pitch," that people with normal hearing impart to their voices during conversation. This upward and downward variation in the fundamental frequency of speech sounds, which is also known as "voice inflexion," is used extensively in ordinary conversation to convey intelligibility and meaning. In fact, the majority of people make surprisingly little effort to pronounce their words correctly, relying very largely on voice inflexions to convey the meaning of what they are saying. In known methods of speech training it is difficult for a deaf child to learn how to vary the pitch of his voice satisfactorily, and he therefore tends to deliver his speech in a monotone. Thus, even though he has learned to enunciate his words clearly, his speech will always sound peculiar and be difficult for ordinary people to understand.

A further problem for many deaf children is that they pitch their voices either far too high or far too low, and this adds to the difficulty of other people in understanding what they are saying.

It is one particular object of the present invention to provide a convenient visual indication of the fundamental frequency of a complex voice waveform, whereby deaf children can be helped to control the pitch of their voices when speaking. In general, however, the invention aims at providing means for indicating the frequency of a selected component of an input waveform.

The present invention consists, basically, of generating a D.C. voltage whose amplitude is a function of the selected component frequency of a complex waveform to be measured and applying this voltage to the deflector system of a visible trace display device, such as a cathode ray tube, so that the displacement of the trace from a datum position is a function of the said component frequency.

In the preferred arrangement, the input waveform is converted into unidirectional pulses having the same repetition frequency as that of the selected component. These pulses are then in turn converted into a corresponding D.C. voltage.

The D.C. voltage may be generated by clipping the input waveform—after amplification if necessary—and shaping it to a substantially square wave of constant amplitude, differentiating and rectifying the square wave to provide unidirectional pulses, and integrating these pulses to obtain the required D.C. voltage.

For the purpose of speech training referred to above, it is preferred to attenuate input frequencies outside a predetermined range so as to minimise the risk of their giving rise to spurious indications.

Circuits are known for clipping and squaring alternating waveforms, among which may be mentioned overdriven amplifier valves, such as pentodes, multivibrator circuits; and diodes. Any one alternative may be selected according to preference.

The invention includes a speech training instrument in which voice frequencies are fed through a selectively variable low pass filter unit to the input of a wave clipping and squaring circuit having a constant amplitude output. This circuit is connected through a differentiating network to a rectifier and thence to an integrating network. The D.C. output voltage of the integrating network is used to deflect the trace on a cathode ray tube so that a person speaking into the instrument has a visual indication of the pitch of his voice. Means may also be provided for indicating amplitude of the voice.

A beam suppression delay network is also preferably included in the circuit of the cathode ray tube for rendering the trace invisible until the D.C. output voltage from the integrating network has reached a substantially steady value.

A practical embodiment of the invention will now be particularly described, by way of example only, with reference to the accompanying circuit diagram of a frequency indicator, including a speech frequency filter and amplifier.

The circuit shown in the drawing comprises basically a two stage amplifier V1, V2; a squarer and clipper stage V3, V4; an oscillator V7; and cathode ray tube indicator V8. For simplicity, heater connections and anode decoupling components for the triode valves V1, etc., are not shown, the earth line 1 and the H.T. positive line 2 of the circuit being connected to a suitable power supply (not shown) which is preferably of the voltage regulated type. Similarly, the heater connection for the cathode ray tube is not shown, and a suitable negative potential is available from the power supply on the line 3.

A wave whose frequency is to be indicated is applied through one arm 4b of a ganged change-over switch 4a, 4b to the grid of the triode V1, the anode of which is connected through a capacitor 5 to the grid of another triode V2. V1 and V2 have their cathodes returned directly to the earth line and so operate as overdriven amplifiers, the anode of V2 being connected by a capacitor 6 and conventional grid stopper resistance to the grid of V3. Operating the amplifiers in an overdriven condition serves to give the leading edges of the input wave a steeper slope, and hence a shape which is more suitable for the succeeding stage V3 and V4.

V3 and V4 have separate grid resistors 7 and 8, separate anode resistors 9 and 10 and a common cathode resistor 11, the anode of V3 being connected to the grid of V4 by a capacitor 12. By suitable choice of the values of the components 7 to 12, the triodes V3 and V4 operate as a cathode-coupled multivibrator having peak positive and peak negative clipping to provide at the anode of V4 an output which is substantially a square wave pulse of constant amplitude. The capacitor 12, which makes the multivibrator regenerative, causes the square wave to have edges of short rise and decay time. It will thus be seen that, provided the input wave has a certain minimum amplitude, its frequency and amplitude can vary between wide limits and the circuit of V1—V4 will always provide a square wave having an amplitude which is constant and a frequency which is that of the input wave. Other circuits may be employed to attain the same end, such as pulse-forming stages which employ diode clippers, or a beam output pentode which is provided with a sufficient input to cause its grid voltage to overswing the limits of cut-off and zero bias conditions.

The square wave output from the anode of V4 is applied to a differentiating circuit comprising a capacitor 13 and a potentiometer resistor 14, the slider of which is connected to the anode of a thermionic diode 15. The cathode of the diode 15 is connected to an integrating circuit which comprises resistors 16, 17, 18 and 19 and capacitors 20, 21 and 22.

The effect of the differentiating circuit 13, 14 is to provide, at the anode of the diode 15, positive and negative going pulses of equal heights but of greater size for high frequencies and less for low frequencies. The diode 15 acts as a rectifier to pass only the positive pulses which are smoothed in the integrating circuit to impress on the grid of one half V5 of a double triode V5, V6 a positive D.C. voltage which is a function of the frequency of the square wave, and thus of the frequency of the input wave.

The valves V5 and V6 have separate anode resistors 23, 24 and a common cathode resistor 25. The grid of V6 is connected to the slider of a potentiometer resistor 26, one end of which is connected to the earth line 1 and the other end to the H.T. line 2. The anodes of V5 and V6 are connected to the deflector plates 27 and 28 respectively of the cathode ray tube V8, the valves constituting a cathode-coupled push-pull D.C. amplifier whereby the trace of the cathode ray tube V8 is deflected along one axis (preferably the Y-axis) of the screen in accordance with the D.C. voltage existing at the grid of V5. Conveniently, the cathode ray tube is mounted so that the trace moves from a lower to a higher position on the screen as the frequency of the input wave at the switch 4a, 4b increases.

The vertical position of the trace on the screen of the cathode ray tube V8 for a given input frequency can be preset by movement of the slider on the potentiometer resistor 26, adjustment of which varies the positive potential of the grid of V6. Similarly the sensitivity of the D.C. amplifier to changes of frequency in the input wave can be made greater or less by moving the slider on the potentiometer resistor 14 either away from or towards the earthed end. In making such adjustments, care should be taken to ensure that neither of the valves V5 and V6 is operated in the cutoff portion of its characteristic, as will be understood by those having experience of D.C. amplifiers of this kind.

The operating potentials of the cathode ray tube are supplied from a resistor network wherein the resistors 29 and 30 are connected in series between the positive H.T. line 2 and the earth line 1, and the potentiometer resistors 31 and 32 are connected in series between the earth line 1 and the negative line 3.

The cathode ray tube V8 has its anode 33 connected to the junction of the resistors 29 and 30; its focusing grid 34 is connected to the slider of the potentiometer resistor 31; its cathode 35 is connected to the slider of the potentiometer resistor 32; and its control grid 36 is connected to the negative line 3 by a resistor 37 and a variable tapping on a potentiometer resistor 38. For a purpose that will be explained later, the resistors 37 and 38 are shunted by a capacitor 39 and the control grid 36 is also connected by part of the resistor 38 and by a series capacitor 40 to the grid of V2, the junction between the resistor 38 and capacitor 40 being connected to the positive side of a crystal diode 41 whose negative side is returned to the negative line 3.

In operation, when an input signal is applied to the grid of V1, a train of positive pulses of equal height but varying size according to input frequency are fed to the integrating circuit 16 . . . 22, which builds up at the grid of V5 a D.C. voltage which is a function of pulse size. The time constant of the circuit will give rise to a slight delay between the moment when the signal appears at the input 4b and the arrival of the trace at its correct position on the screen of V8. One purpose of the integrating circuit is to ensure that the voltage appearing at the grid of V5 has a negligible residual A.C. component, and if the time constant is made very short, the trace will arrive at its correct position on the screen very rapidly, but, for low frequencies, the trace will be widened out in a vertical direction due to the incomplete elimination of the A.C. component in the integrated voltage. The value of the components 16 to 22 should therefore be chosen as a compromise between a satisfactory smoothing of the voltage at the grid of V5 and a sufficiently fast rise time for the purpose for which the apparatus is to be used. In this connection it should be noted that the regenerative action of the multivibrator stage V3, V4 referred to above aids rapidity of response of the trace during use of the apparatus by tending to maintain a signal across the diode rectifier 15, and hence a small voltage on the integrator circuit 16 . . . 22.

In certain speech training applications of the invention it is advantageous to provide means whereby the cathode ray tube trace is not rendered visible to the observer or the pupil until the time lag inherent in the integrating circuit 16—22 has elapsed. Such a beam suppression delay network is provided, in the embodiment of the invention shown in the drawing, by the components 37 to 41 mentioned previously. In the absence of a signal at the grid of V2 the grid 36 of the cathode ray tube V8 is maintained at the negative voltage of the line 3 by the resistor 37, 38, and the slider on the potentiometer resistor 32 is set to a position which cuts off the cathode ray trace. When an alternating wave appears at the grid of V2 it is passed by the capacitor 40 to the diode 41 which sets up positive unidirectional pulses. These are integrated by the resistor 38 and capacitor 39.

By appropriate selection of the tapping point on the resistor 38 for the grid 36, the trace will remain suppressed after initial appearance of a signal at the grid of V2 for sufficient time to allow the D.C. voltage at V5 to reach substantially its final value. Similarly, on removal of the signal from the grid of V2, the positive voltage across the diode 41 disappears, causing depression of the voltage on the grid 36 to a value sufficient to suppress the trace. This beam suppression feature is particularly useful when the apparatus is being used to demonstrate the pitch of the human voice. In certain other applications of the invention to frequency indication, it may be advantageous to arrange for the beam suppression circuit to be instantaneously responsive to the appearance and cessation of a signal at the grid of V2. For this purpose the slider on the resistor 38 would be located adjacent the junction of this resistor and the diode 41. In this position of adjustment, the integrating action of the resistor 38 and capacitor 39 is not used. The beam remains suppressed for inputs below a threshold value mainly determined by the setting of the slider on the resistor 32.

Returning now to the deflector end of the cathode ray tube V8, one X-plate 42 is connected to the anode 33 through a resistor 43, and by a capacitor 44 to a tapping on the anode load resistor 45 of V7. The control grid of V7 is connected through a tapped inductance 46 shunted by a tuning capacitor 47 to the earth line 1, and the cathode of V7 is connected to the tapping point on the inductance 46. V7 thus acts as a regenerative oscillator the frequency of oscillation being determined by the values of the inductance 46 and of the capacitor 47. The frequency of this oscillation is in no way critical since its purpose is merely to widen out the trace into a horizontal line which is more easily seen than a spot and is also less likely to burn the screen of the tube V8 when the apparatus is indicating an input wave whose frequency is constant.

The input to the instrument can be derived either from an external source, represented by the free terminal 48 connected to one pole of the change-over switch 4a, 4b, or— as when the instrument is used for speech-training—from a carbon microphone 49 and low pass filter circuit generally indicated at 50 which is followed by an amplifier triode V9.

In teaching a deaf person to speak, it is sometimes desirable also to indicate visually the amplitude of his or her voice, and the linear spread of the trace can be used for this purpose by superimposing on one of the X-plates a voltage which is a function of amplitude of the input wave-form. In the drawing, the plate 51 is shown connected by a resistor 52 to the anode 33 of the cathode ray tube V8 and also, through a capacitor 53, to the anode of an audio-frequency amplifying triode V10. The grid of this triode is connected to the slider of a potentiometer resistor 54 which is connected across the secondary 55 of an audio-frequency transformer the primary 56 of which is in circuit with the microphone 49. Thus, as the current from the microphone 49 varies in accordance with volume of the voice input, a varying voltage appears at the anode of the triode V10 and is transmitted to the plate 51 to vary the width of the trace.

The microphone 49, which for speech purposes is conveniently of the throat-operated type, is energised, when the change-over switch 4a, 4b is operated, through the primary winding of a microphone transformer 57 by a suitable D.C. voltage source such as a battery 58. The triode V9, operating as an audio-frequency amplifier, has its anode connected by a capacitor 59 to the appropriate contact of the change-over switch 4a, 4b. The grid of V9 is fed from the secondary winding of the transformer 57 by an adjustable low pass filter 50 comprising an inductance 60, selector switches 61 and 62 and six capacitors 63 to 68.

When uttering speech sounds the vocal chords generate a number of harmonics as well as the fundamental frequency. In certain speech sounds some of the harmonics have amplitudes which are large compared with that of the fundamental frequency, and if they are allowed to be passed to the frequency indicator they would produce a spurious signal which would not be the true fundamental pitch of the voice as is required. It is therefore necessary that these harmonics be attenuated to a level where they do not give a signal on the screen of the cathode ray tube, V8. The average pitch of a man's voice is about 120 cycles per second; that of a woman's voice about 240 cycles per second; and that of a childs' voice somewhere in the neighborhood of 400 cycles per second.

A given low pass filter which has a cut-off frequency suitable for the range of voice pitch of one person would not be suitable for someone else with a somewhat higher or lower pitched voice, and it is therefore necessary to provide a low pass filter 50 which can be altered to give a number of different cut-off frequencies in the range of approximately 200 to 800 cycles per second. For simplicity, the low pass filter shown in the drawing has only three alternative positions, the switches 61 and 62 being ganged together so as to bring into operation either the capacitors 63 and 66 or the capacitors 64 and 67, or the capacitors 65 and 68, the values of the three pairs of capacitors and of the inductance 60 being chosen so as to provide three different cut-off frequencies. Furthermore, the switches 61 and 62 may be ganged to similar switches (not shown) for selecting alternative values of capacitor at 20, 21, 22 in the integrating circuit 16 . . . 22 so that the stabilising time for the trace on the screen of the cathode ray tube V8 can be kept to a minimum practicable for each band selected at 61, 62. A similar selection of values of capacitor 39 may also be made.

A frequency scale (not shown), calibrated in cycles per second, may be provided for the screen of the cathode ray tube V8, whereby frequency measurements within a predetermined range are directly indicated. If desired, suitable switching (not shown) may also be provided whereby the value of the capacitor 13 and the effective positions of the sliders on the potentiometer resistors 14 and 26 are suitably altered to enable the apparatus to be used in conjunction with a plurality of calibrated scales of different frequency ranges.

For use in conjunction with a microphone for indicating to a deaf person the mean pitch of his voice and upward and downward frequency variations thereof, the cathode ray tube screen may be provided with three parallel horizontal lines (not shown), positioned respectively across the centre of the screen and towards the upper and lower edges thereof. The three lines may then be used to indicate respectively the mean pitch and suitable upper and lower pitch limits for a speaker's voice.

As an example, let it be assumed that a particular deaf child has grown up to have a speaking frequency of 600 cycles per second and that it is desired to train the child first to bring the pitch of his voice down to a mean value of 400 cycles per second, and second to vary the pitch of his voice during speech between an upper limit of 500 cycles per second, and a lower limit of 300 cycles per second (a range of just under an octave). For the first stage of this training the switches 61, 62 of the low pass filter 50 would be set to give a cut-off frequency at about 650 cycles per second and the sliders on the resistors 14 and 26—together with the adjustment for the capacitor 13, if provided—would be set so that a frequency of 400 cycles per second appears on the central, or mean frequency, line with frequencies of 300 and 500 cycles per second appearing on or near the lower and upper limit lines respectively on the screen of the cathode ray tube. Upon uttering his hitherto accustomed pitch frequency of 600 cycles per second, the deaf child sees that this is almost off the top of the screen, and in time he learns to bring down the pitch of his voice so that it appears on the mean pitch line, i.e. at the required frequency of 400 cycles per second. For the second stage of his training, the low pass filter 50 would be switched to give a new cut-off frequency of 500 cycles per second. The child can then be taught to impart upward and downward inflections in the pitch of his voice to an increasing extent until eventually he leans to vary his voice fully up to the upper limit line (500 cycles per second) and down to the lower limit line (300 cycles per second).

When the frequency indicator is used for a purpose such as this, a calibrated audio frequency generator (not shown) is connected at 48 to provide a known input to the circuit instead of the voice frequencies. Such a generator provides a convenient means for setting up the instrument to the required range and also for checking from time to time that the setting has not altered in any way.

When used for the demonstration of pitch during spoken words containing introductory consonant sounds such as "p," "f" and "s," the delay in the appearance of the cathode ray trace imparted by components 37 to 39 is especially useful. Such speech sounds are called "unvoiced" in that the vocal chords are not maintained in a steady state of vibration during their production. Without the above delay in the appearance of the trace an undesirable fluttering of the trace is caused on the screen during the time such unvoiced speech sounds are being uttered. It is helpful to the deaf children to reduce so far as is possible any spurious indication, such as the above fluttering, while their voices are being trained on the frequency indicator described herein.

Detailed modifications may be made to the circuit described above and illustrated in the drawing without departing from the scope of the invention. For example, where a more permanent record of input waveform frequency is required, the cathode ray tube V8 may be supplemented or replaced by a recording instrument. This may be of any standard form such as a pen recorder, recording oscillograph, or other device for displaying a visible trace. The pulse forming stage V3 ... 14 can be replaced by a circuit which is known per se and in which the pulse size is constant while the repetition frequency the same as the input signal frequency or the frequency of the selected component of a complex input waveform. The amplitude of the input signal or complex waveform may be displayed or indicated separately from the frequency.

Furthermore, the input channel 4b, V1, V2 may be modified in any conventional manner in order to adapt the apparatus to any special characteristic of particular input signals. For example, where the input signals whose frequency is to be indicated or displayed are of short duration, a conventional storage or memory device may be added to or substituted for the said input channel. Where the input is a pure sine wave, the term "selected component" becomes synonymous with "fundamental."

Throughout this specification and the claims appended thereto, the terms "valve," "diode" and "triode" are to be understood as including both the conventional evacuated tubes and their transistor counterparts, where appropriate.

I claim:

1. A frequency indicator comprising a visible trace display device; means in said device for controlling the position of the trace relative to a chosen datum; a signal input channel; a circuit coupled to said channel for converting the input waveform to a square wave of constant amplitude; series-connected differentiating, first rectifying and first integrating circuits for deriving from said square wave a D.C. voltage whose magnitude is a function of the input signal frequency; means for applying said derived D.C. voltage to said display device for controlling the position of the trace relative to the datum in accordance with the input signal frequency; and a trace-suppression circuit including a second rectifier fed direct from the signal input channel; a second rectifier fed direct from the signal input channel; a second integrator circuit connected across said second rectifier; and a connection from said second integrator to a trace control electrode of said display device for suppressing said trace until said D.C. voltage has reached its appropriate magnitude.

2. A frequency indicator comprising a cathode ray tube; a signal input channel including an amplifier stage; a waveform clipping and squaring circuit; fed from said input channel; a differentiator circuit and a first rectifier coupled to said clipping and squaring circuit; a first integrator circuit for integrating the output from said first rectifier; a D.C. amplifier for amplifying the output from said first integrator circuit; a connection from the output of said amplifier to one pair of beam deflection electrodes of said cathode ray tube; a second rectifier fed direct from the input amplifier stage; a second integrator circuit connected across said second rectifier and coupled to a source of negative potential; and a connection from said second integrator circuit to the trace brightening electrode of said cathode ray tube such that the trace is suppressed until the output from said first integrator circuit reaches a steady value.

3. A frequency indicator comprising a cathode ray tube; a signal input channel including an amplifier; a waveform converting circuit connected to said amplifier for producing a square wave of constant amplitude and the same frequency as the input signal; a first differentiating, rectifying, and integrating circuit connected in series with the output from the waveform converting circuit; means for feeding the output voltage of the said first integrating circuit to one pair of electrodes of said cathode ray tube; a second differentiating, rectifying and integrating circuit fed direct from the input channel; and an adjustable tapping on said second integrating circuit connected to the trace brightening electrode of said cathode ray tube for suppressing the trace until the output voltage from the said first integrating circuit has reached a stable value.

4. A voice frequency indicator comprising a cathode ray tube; a fundamental voice frequency input filter circuit; a voice frequency input signal amplifier; a waveform clipping and squaring circuit connected to said amplifier and having a substantially constant amplitude output; a first differentiating circuit and series rectifier fed by said clipping and squaring circuit; an adjustable integrating circuit coupled to said rectifying circuit for producing a D.C. potential which is a function of the fundamental voice frequency input; a D.C. amplifier having its output coupled to the Y-plates of the cathode ray tube; an oscillator connected to the X-plates of the cathode ray tube; a circuit for superimposing on the X-plates a voltage which is proportional to the amplitude of the input voice frequency signals; a second differentiating circuit fed from said input signal amplifier; a second rectifier connected across the output from said second differentiating circuit; a second integrating circuit coupled to said second differentiating circuit and an adjustable tapping on said second integrating circuit connected to the control grid of said cathode ray tube whereby the trace may be suppressed until said D.C. potential becomes stabilised.

5. A voice frequency indicator comprising a cathode ray tube; an adjustable low-pass input signal filter; an overdriven voice frequency amplifier fed from said input filter; a cathode-coupled multivibrator for clipping and squaring the output waveform from said overdriven amplifier; a first differentiating, rectifying and integrating circuit coupled in series with said multivibrator; a D.C. amplifier connected to said first integrating circuit; a connection from said D.C. amplifier to the Y-plates of said cathode ray tube; a second differentiating, rectifying, and integrating circuit coupled direct to said voice frequency amplifier; an adjustable tapping on said second integrating circuit connected to the trace brightening electrode of said cathode ray tube for suppressing the trace until the D.C. output from said first integrator is stabilised; and means coupled to the X-plates of said cathode ray tube for controlling the spread of the trace on the screen of said cathode ray tube in accordance with the amplitude of said input signal.

6. A frequency indicator comprising an input channel for signals having a repetitive waveform; a filter for selecting a desired component frequency of said input signal waveform; a pulse generator fed from said filter for generating unidirectional pulses having the same repetition frequency as that of said selected component frequency and including a pulse height limiting circuit; a first differentiating circuit, and a first rectifier connected in series; means for varying the time constant of said differentiating circuit in dependence on the frequency of said selected component; an integrator fed from said rectifier; a second differentiating circuit and parallel-connected second rectifier and second integrator circuits fed from said filter; a visible trace display device having means coupled to the first integrator output for controlling the position of the trace relative to a datum position; and a connection between a tapping on said second integrator and the trace brightening electrode of the display device for suppressing said trace until the output voltage of said first integrator is substantially stabilised at the value corresponding to said selected frequency.

7. A voice frequency indicator as claimed in claim 5 including a microphone, a coupling between said microphone and said input signal filter; and a further coupling between said microphone and an amplifier coupled to said X-plates.

References Cited in the file of this patent

UNITED STATES PATENTS

| | | |
|---|---|---|
| 2,137,888 | Fuller | Nov. 22, 1938 |
| 2,416,353 | Shipman | Feb. 25, 1947 |
| 2,467,777 | Rajchman | Apr. 19, 1947 |
| 2,500,431 | Potter | Mar. 14, 1950 |
| 2,620,455 | Focker | Dec. 2, 1952 |
| 2,648,027 | Geohegan | Aug. 4, 1953 |